Nov. 25, 1969  H. P. SCHLAEPPI  3,480,914
CONTROL MECHANISM FOR A MULTIPROCESSOR COMPUTING SYSTEM
Filed Jan. 3, 1967  14 Sheets-Sheet 1

INVENTOR
HANS P. SCHLAEPPI
BY
ATTORNEY

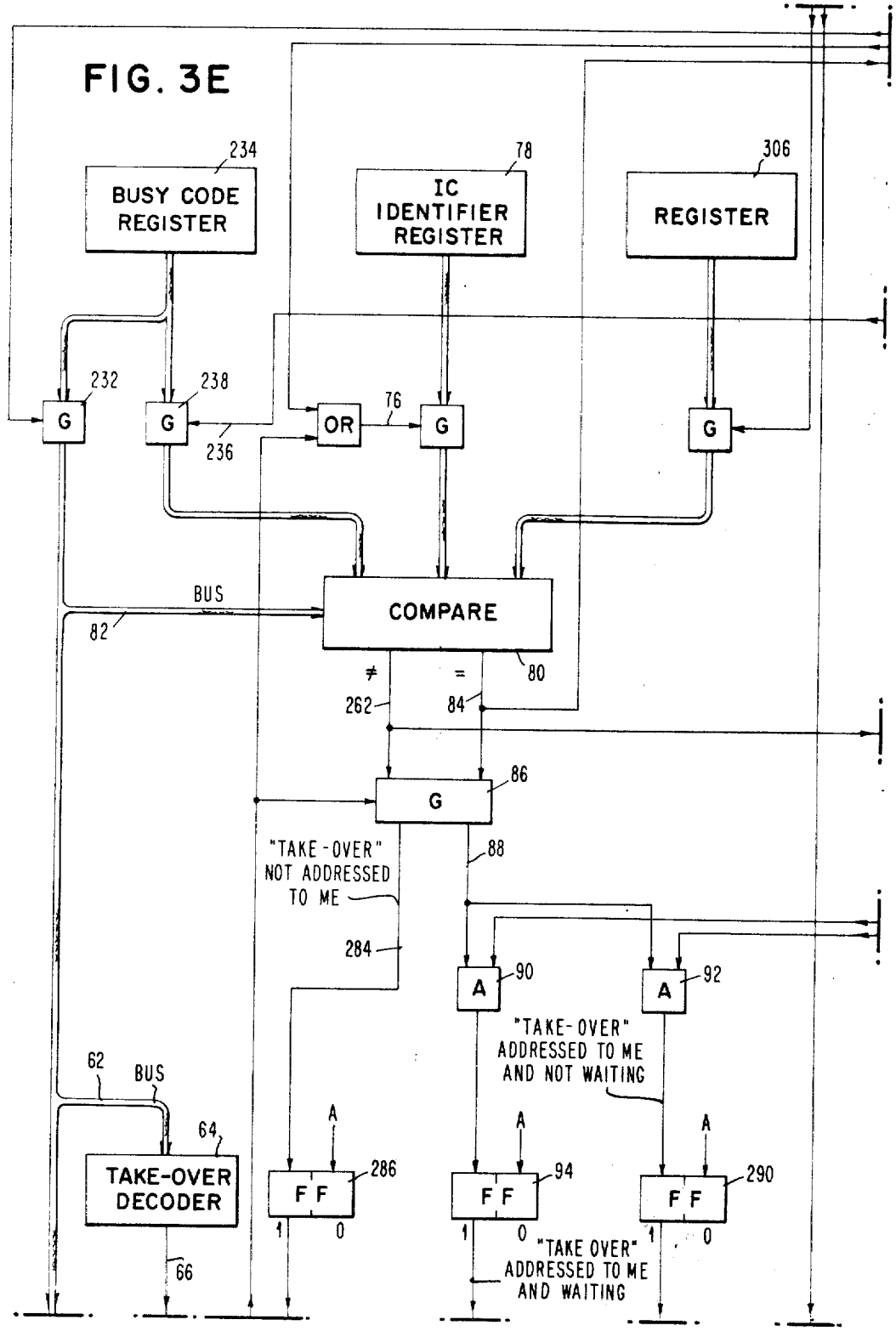

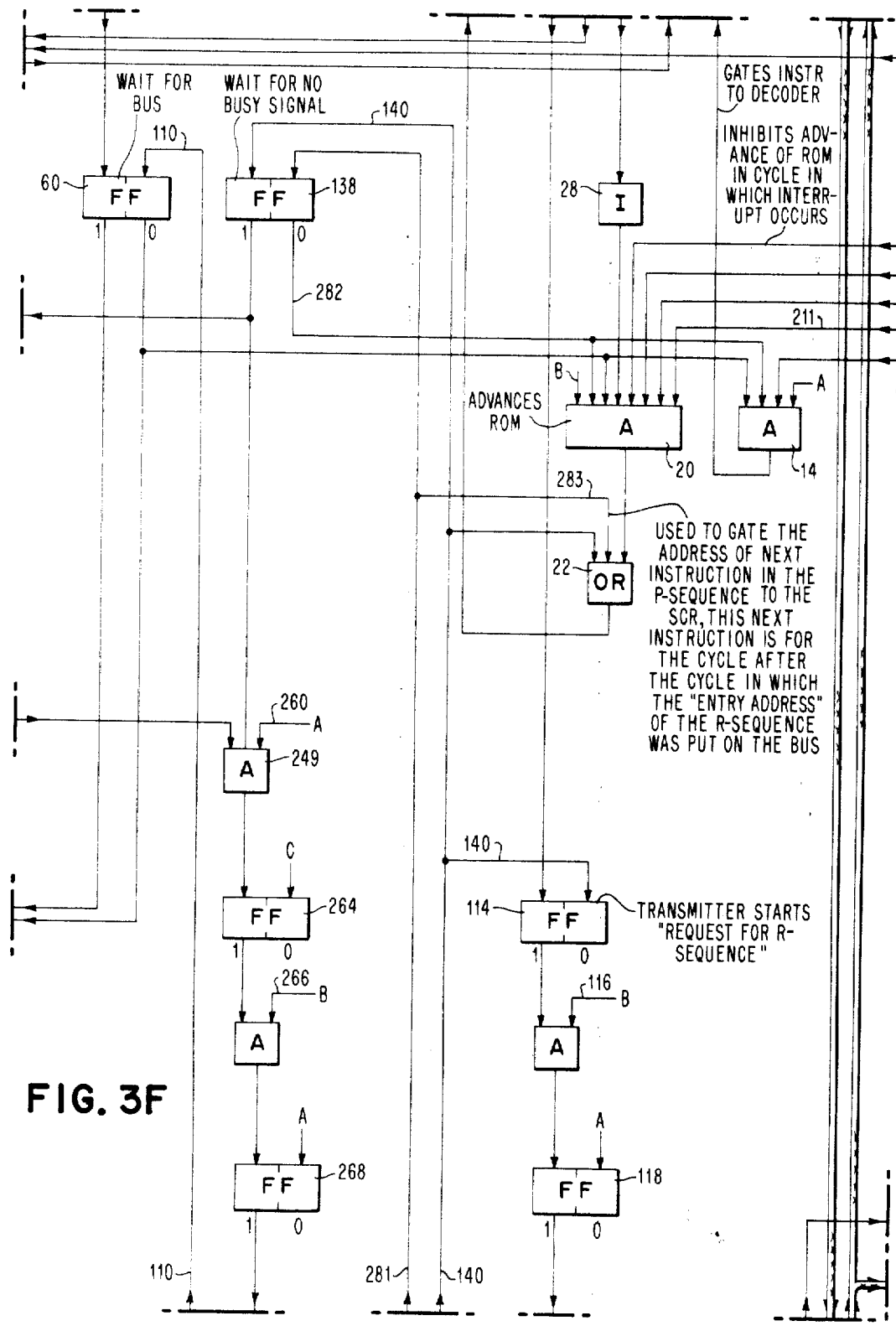

REQUEST IDENTIFICATION SEQUENCE

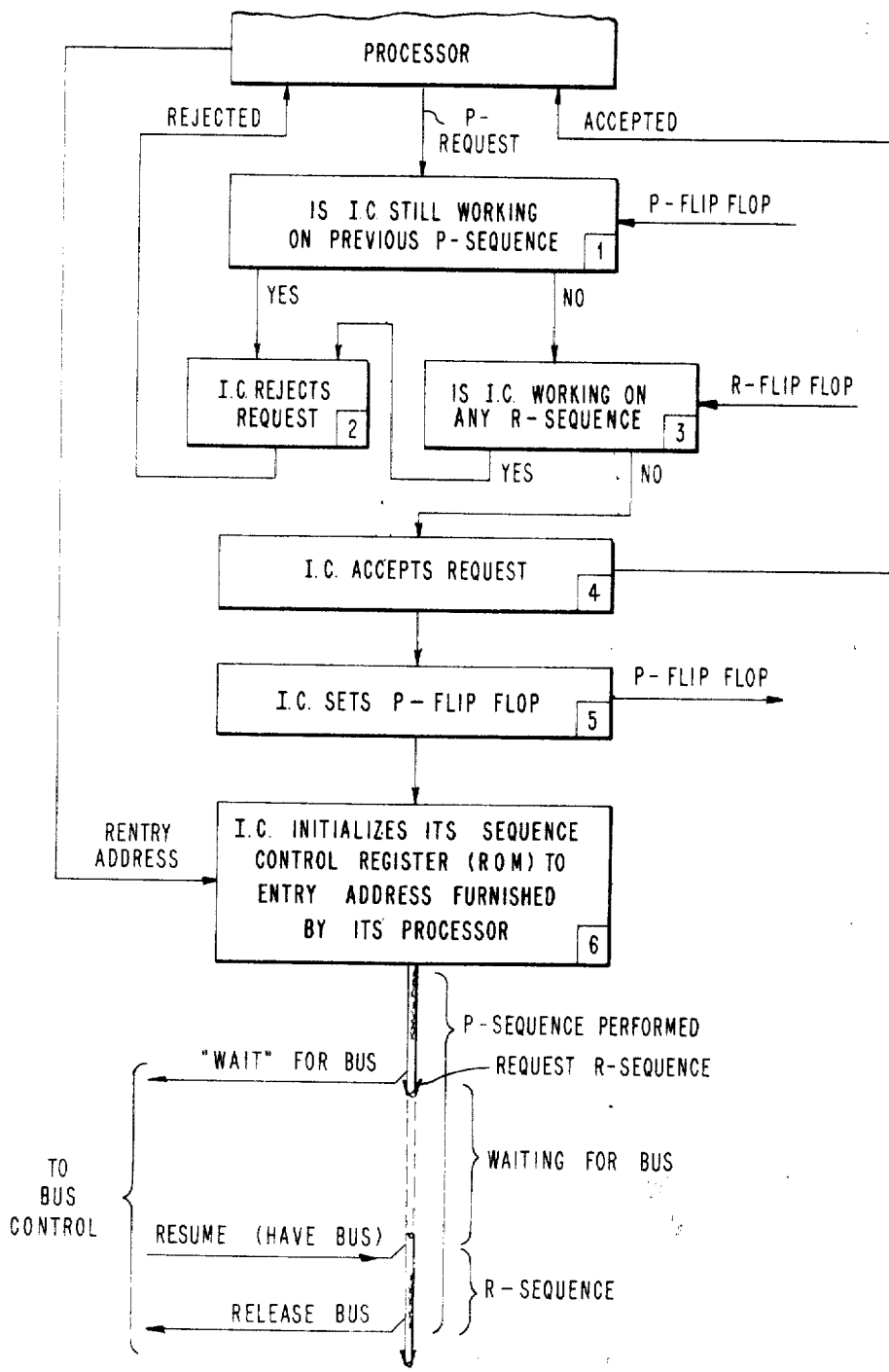

United States Patent Office 3,480,914
Patented Nov. 25, 1969

3,480,914
CONTROL MECHANISM FOR A MULTI-
PROCESSOR COMPUTING SYSTEM
Hans P. Schlaeppi, Chappaqua, N.Y., assignor to International Business Machines Corporation, Armonk, N.Y., a corporation of New York
Filed Jan. 3, 1967, Ser. No. 607,040
Int. Cl. G11b 13/00; G06f 1/00, 7/00
U.S. Cl. 340—172.5    22 Claims

ABSTRACT OF THE DISCLOSURE

The present invention relates to improved control facilities for a computer organization comprising several processing units or processors. More particularly, it relates to such control facilities wherein each processor can be thought of as being associated with a separate control mechanism or interaction unit wherein each of said units can communicate directly with like units associated with other processors. The interaction units communicate with each other over a special shared communication bus wherein only one unit can be transmitting over the bus at any one time. Any of these special interaction units may be working on a task on behalf of their own individual processor or performing a task or request which was requested by one of the other interaction units. A significant feature of the proposed control mechanism is that each of the special interaction units works in parallel with its own processor and may additionally perform tasks for other processors which in more conventional systems would require an interruption of the task the processor is currently performing. Additionally, special control features are provided so that the interaction units may communicate directly with each other without going through time consuming memory access cycles. While the present embodiment illustrates a satisfactory method of achieving the interaction control, it will be apparent that many other hardware configurations could be utilized which would be capable of performing the broad functional operation prescribed by the present invention.

BACKGROUND OF INVENTION

Current developments in the electronic industry in general and the computer industry in particular have caused an ever increasing trend towards larger and more sophisticated electronic computers. These trends and developments have to a large extent been made possible by higher speed and less expensive circuit elements. Further increases of system throughput have to come from improved organization of computing systems. A form of organization that continues to receive increasing interest is that of several autonomous processing units arranged so that they share a common workload. This organization will be called a multiprocessor.

It is an obvious fact that any shared computing system must have facilities for controlling the application of its resources, such as processors, storage space and Input-Output (I/O) devices, to the work load presented to it by the users. The functions it has to perform to this end may be called executive functions. They are determined by the operational requirements of the user community.

The methods available for implementing these functions and their efficiency depend on certain properties of the system architecture, the structure imparted by users and system to the information manipulated, and the structure of processes the system creates in operation.

The design goal of any computer system is to achieve high overall efficiency while meeting a set of rather general operational objectives which may be summarized by the requirement that an individual user receive the full benefits from the large pools of resources and information existing in the system, so as to secure service within a time interval specified by him (subject to capacity limitations) of the lowest possible cost.

In order to describe the present invention certain terms should first be defined. A multiprocessor is viewed as a computing system that comprises a number of autonomous processors sharing access to common store or memory and executing programs concurrently. The term "job" will be used to designate the entire activity that is engendered in the system by the acceptance of an individual user request for computation. Any multi-processor is capable of processing several independent jobs concurrently.

It is well known that many jobs can be dissected into sequences of instruction executions which are logically almost independent of one another. These sequences will be called tasks. Given a job that is composed of several tasks, a multi-processor can be made to process these concurrently. This mode of operation has been termed parallel processing.

Historically two distinct lines of thought have motivated development of multiprocessing. The first sought to capitalize on the potential for greater flexibility in resource allocation inherent in multiprocessing to achieve higher utilization of equipment (higher throughput per dollar) than would be obtained from uni-processor configurations under the same load mix. The other line exploited the modularity of multiprocessing hardware in order to achieve higher service availability (fail safe) and/or transparency of additions of resources to programs, as deletions thus obviating the need to reprogram after such changes. The implementation of parallel processing on a multiprocessor extends the enhanced allocation flexibility to individual jobs, thus potentially reducing their processing times.

The present invention represents an attempt towards the solution of the problem of providing facilities that permit user and executive tasks running concurrently, to interact with each other where appropriate, without having to intersperse the programs with numerous test inter-actions for this purpose, which could be wasteful of memory space and storage cycles. The solution of this problem becomes especially important when it is necessary to fully exploit the processing potential of large multiprocessing systems.

While a number of prior art attempts towards the design of various size multiprocessing systems have been made, it is believed that all of these systems have either resorted to repeated polling of storage locations or to functionally specialized wiring between processors for the purposes of interaction. The former is costly in storage space and cycles, as mentioned before, the latter is costly in hardware and functionally not very powerful.

It was believed that a more efficient utilization of the hardware of a multiprocessing system can be achieved by providing a facility for direct interaction between processors and/or channels. By taking this approach it is felt that considerable savings in processor time that would otherwise be spent in waiting for memory access, could be accomplished. A powerful approach to providing the direct interaction facility is to associate each processing unit with a separate control unit that works independently of the sequence control unit(s) forming part(s) of the processor proper. In addition to furnishing the interaction facility, this autonomous control unit can be used to effect significant improvements of throughput by executing certain administrative procedures in parallel with the processing of user tasks on the associated processing unit, thus obviating many interruptions of said user tasks.

GENERAL DESCRIPTION OF INVENTIVE CONCEPTS AND OBJECTS

It has now been found that enhanced performance of a multiprocessor control system may be achieved by providing a separate control unit hereinafter to be referred to as an Interaction Controller (IC) for each processing unit, each I/O controller and in cetrain systems, each channel of a multiprocessor system. All these units, having sequence control mechanisms of their own will in the sequel be referred to as processors.

Each separate Interaction Controller has the capability of communicating directly with its own Processor and also with all of the other Interaction Controllers over a common bus. It is significant that each one of these controllers is capable of operating in parallel with its own processor and is able to do certain activities in systems not having IC's which would have to be done by the processor. These activities generally require no other memory accesses or communication with other Interaction Controllers. Additionally, the Interaction Controllers are capable of performing special tasks for other "calling" Interaction Controllers which operations can similarly proceed in parallel with the individual Processors. The result of the action of a particular Interaction Controller will severally affect the operation of the associated Processor. Examples of various operation performed by the Interaction Controllers will be discussed later on in the specification. However, it should be understood that the primary contribution of the present invention is the organization of the interaction system and the manner in which its component units are linked to each other and to their associated processors. The particular sequences which they perform in addition to those establishing communication paths among themselves are essentially defined by micro-programs stored in a Read Only Memory that is part of each unit. The execution of these detailed instructions is considered incidental to the overall concepts of the invention. Decoders and functional circuitry to perform common functions in response to microinstructions are well known and the inclusion of same would only tend to obfuscate the present invention.

It is accordingly a primary object of the invention to provide a control mechanism that is part of the organization of a multiprocessor computer system which greatly enhances certain functions of said system.

It is a further object to provide such a control mechanism wherein each individual processor of said multiprocessor organization is associated with a separate control unit capable of performing certain executive functions independently of the processor.

It is yet another object to provide such a control mechanism which is capable of working in parallel with the individual processors and which avoids certain memory access cycles by virtue of the direct communication link provided between said control mechanisms.

The foregoing and other objects, features and advantages of the invention will be apparent from the following more particular description of the preferred embodiment of the invention, as set forth in the accompanying drawings and specification.

The objects of the present invention are accomplished in general by a multi-processor computing system including a plurality of individual processor units sharing a common central memory system. Each processor is connected directly to an interaction control unit that is controlled independently of the processor sequence control, said interaction unit being operative in response to commands from either its associated processor or from another interaction control unit. The commands of the latter kind are transmitted to the interaction control unit considered, by means of a common bus provided for linking together all of the interaction control units associated with each processor. Means are included within each of said interaction control units for operating in a response to commands appearing on this common bus transmitted by other interaction control units as well as in response to commands issued by the processor to which a given control unit is directly connected. However, commands issued by a processor other than that directly connected with the interaction unit in question, may not directly influence this control unit.

In the disclosed embodiment, the common bus linking the interaction control units hereinafter called Interaction Controllers performs like a telephone line wherein only one person can talk at any one time. Accordingly, means are provided within the Interaction Controllers for passing control of said bus between the various controllers and for maintaining control of said bus by a given controller until this controller no longer requires it. Additional means are provided wherein a given Interaction Controller may request the services of one or several of the other controllers and wherein said other controllers may indicate whether they are currently able to accept the request for service. While, as stated previously, the presently disclosed embodiment is believed to be a completely operative and useful design it will be readily appreciated that many changes could be made in the system controls and operating rules without departing from the present concept of the overall system organization.

DRAWINGS

Figure 1:
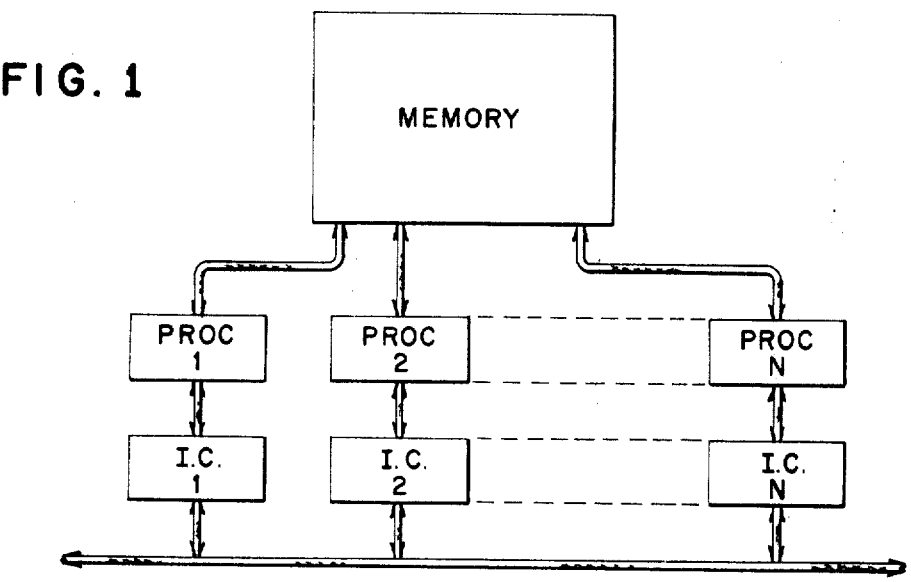
FIG. 1 is an organizational block diagram of a multiprocessor system incorporating the control concept of the present invention.
Figure 2:
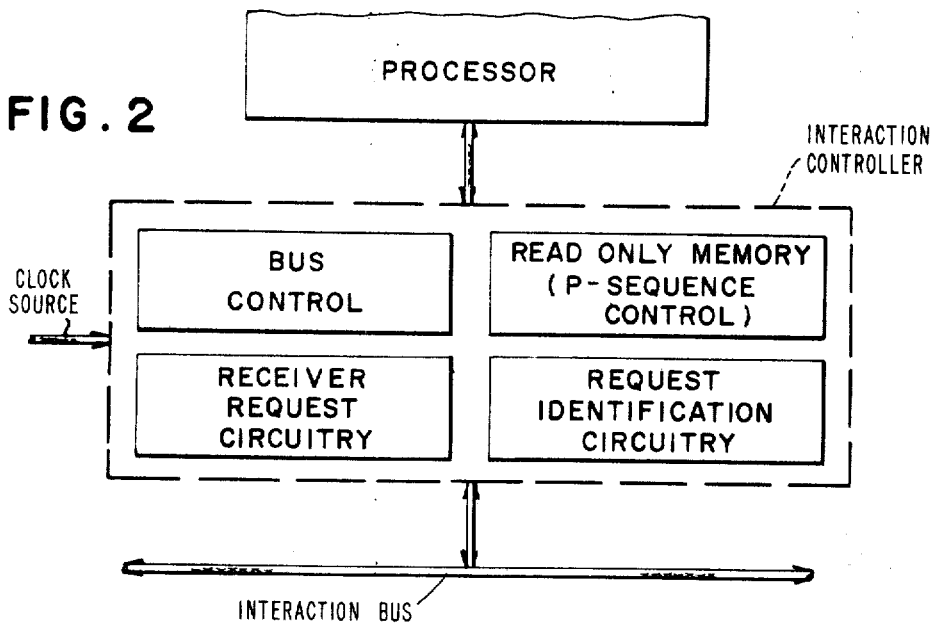
FIG. 2 is a functional block diagram indicating the functional contents of an individual Interaction Controller (IC) as shown on FIG. 1.
Figure 3A:
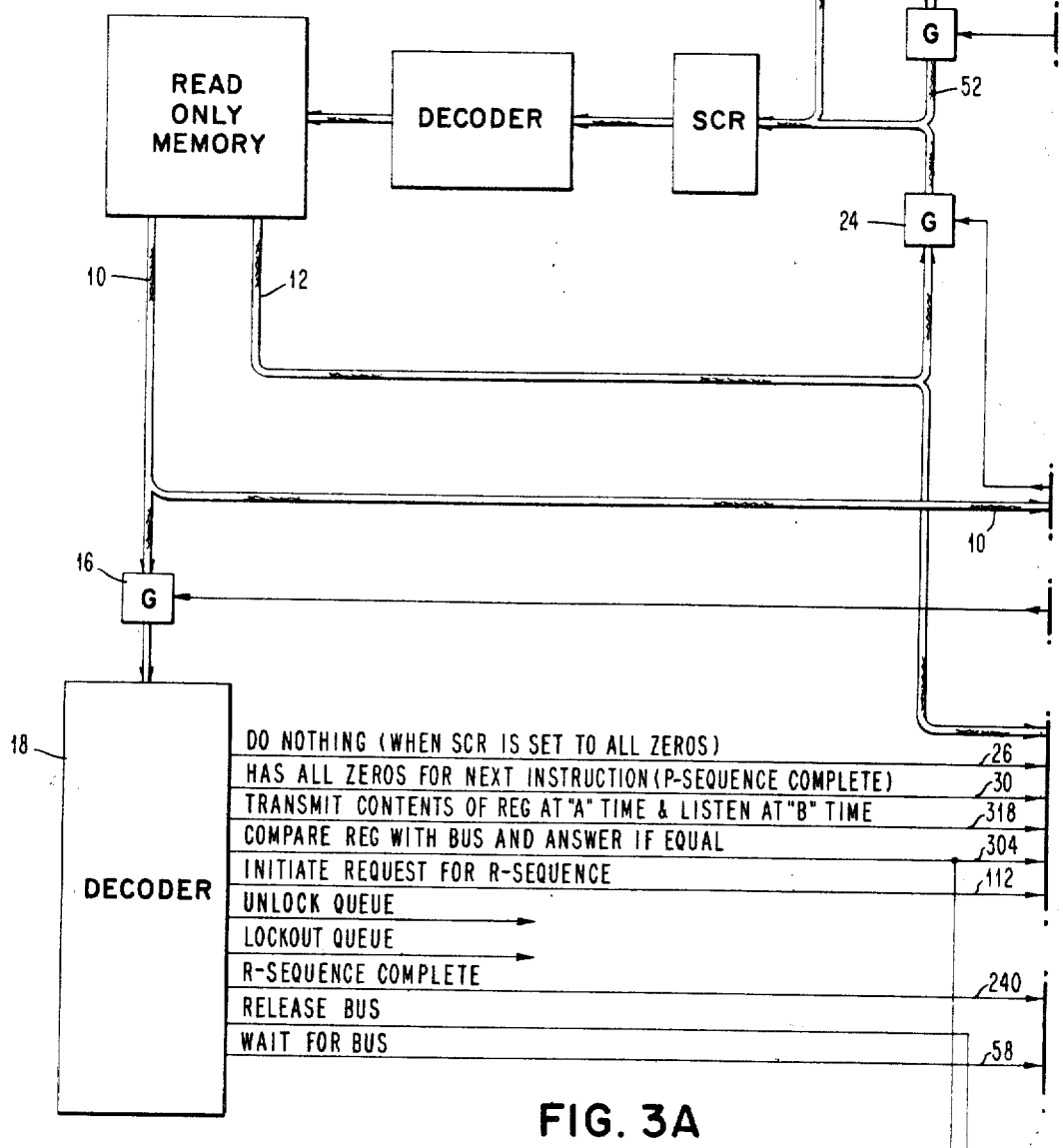
FIG. 3 is an organizational drawing for FIGS. 3a–j.
Figure 3B:
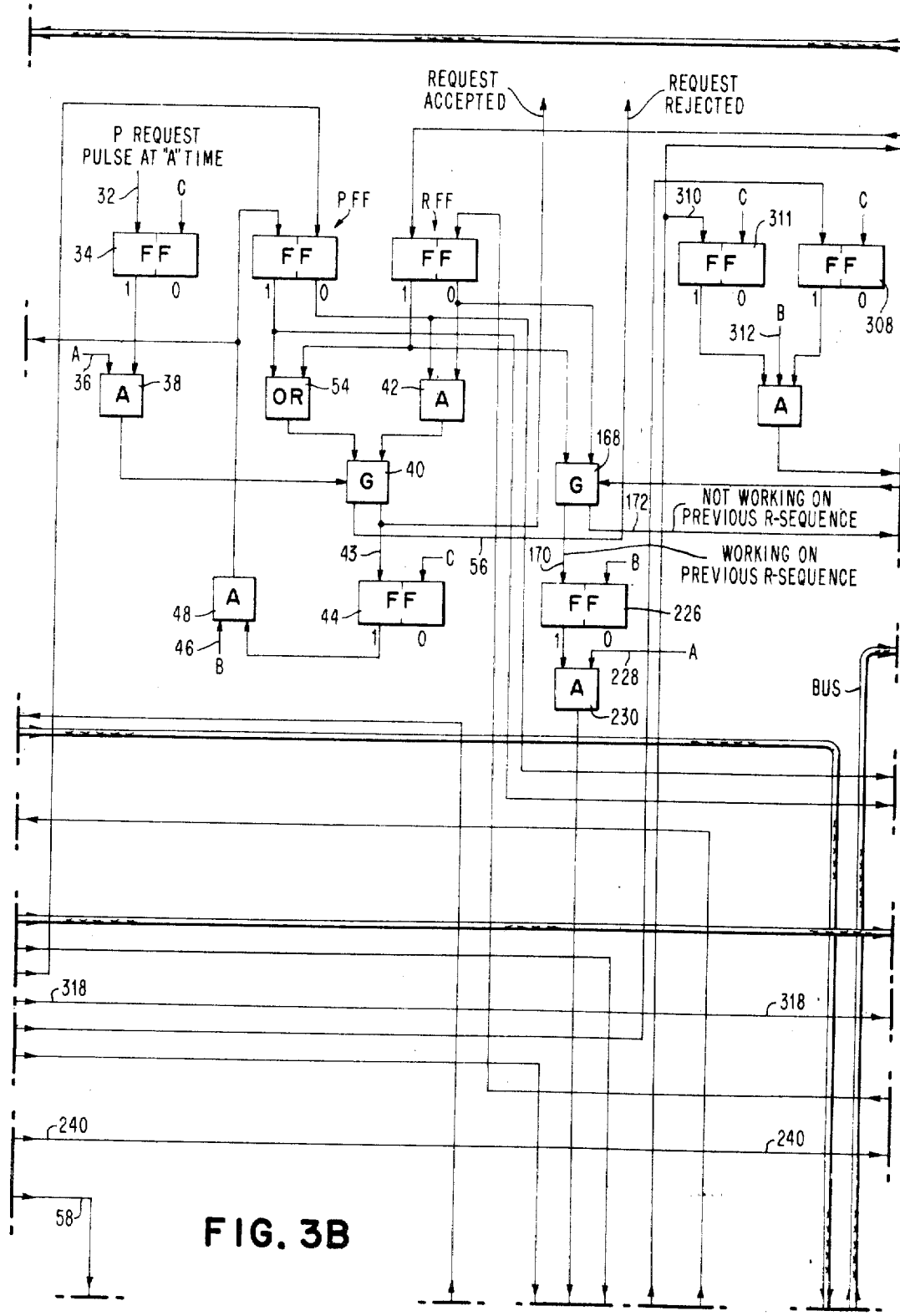
Figure 3C:
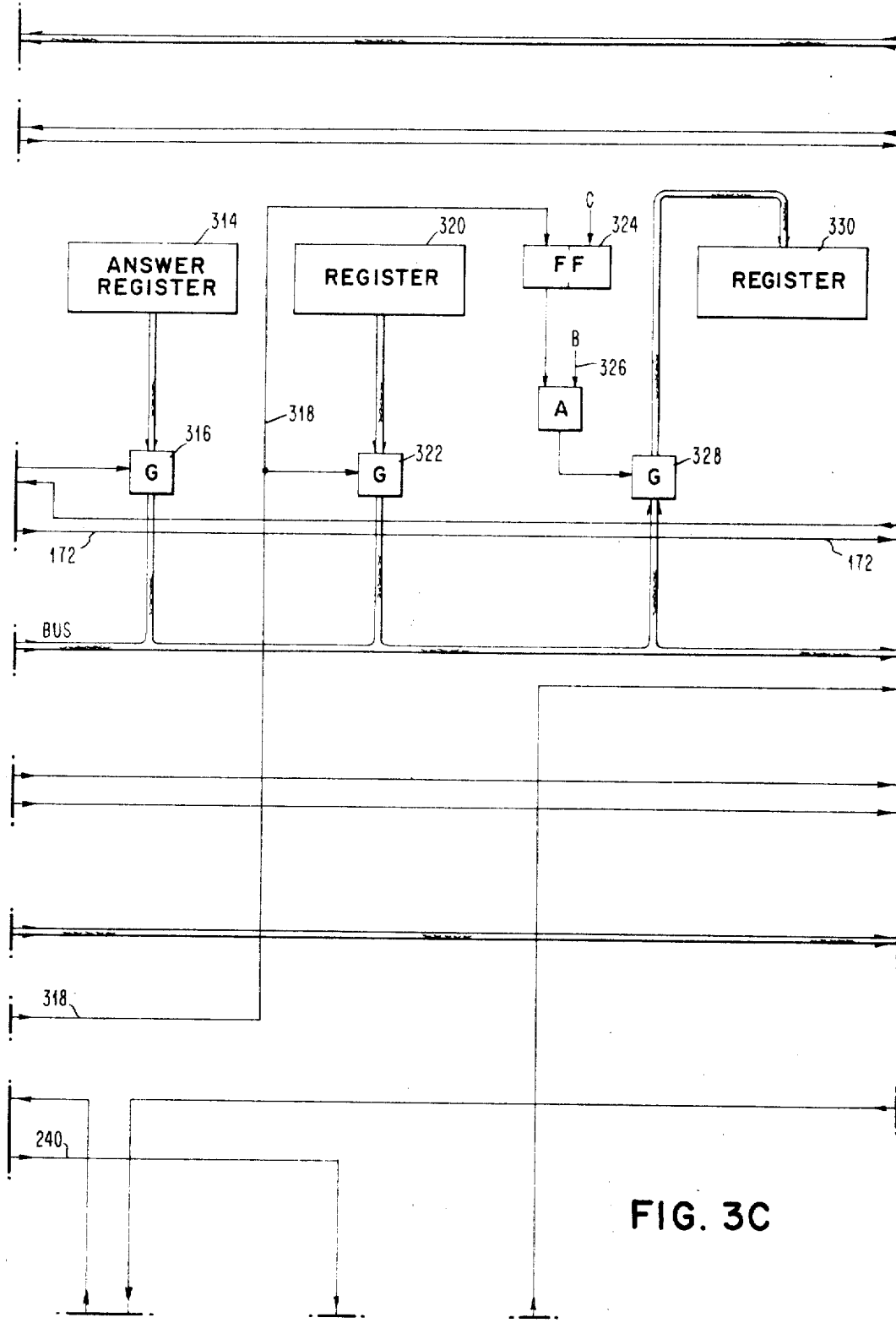
Figure 3D:
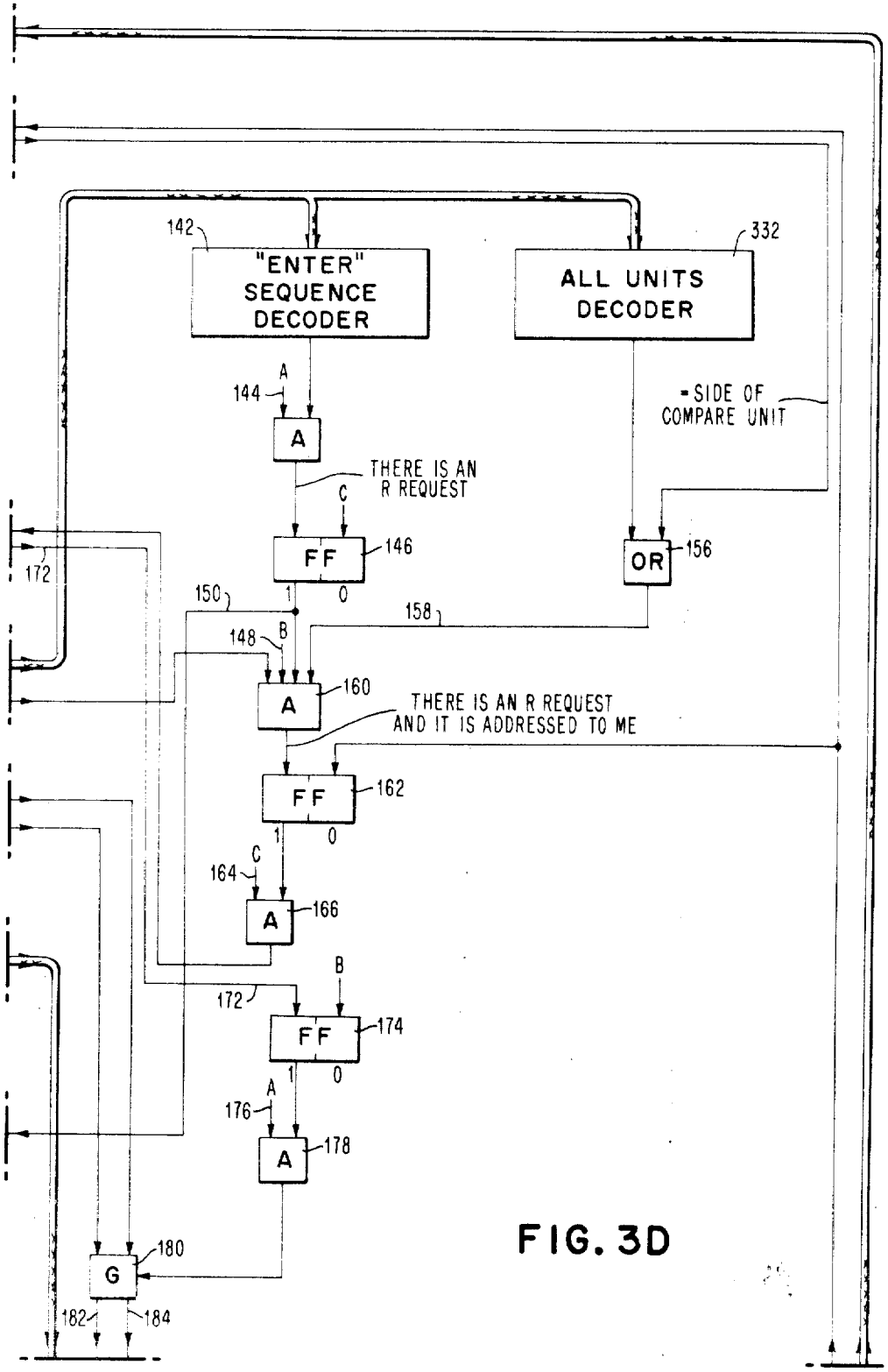
Figure 3G:
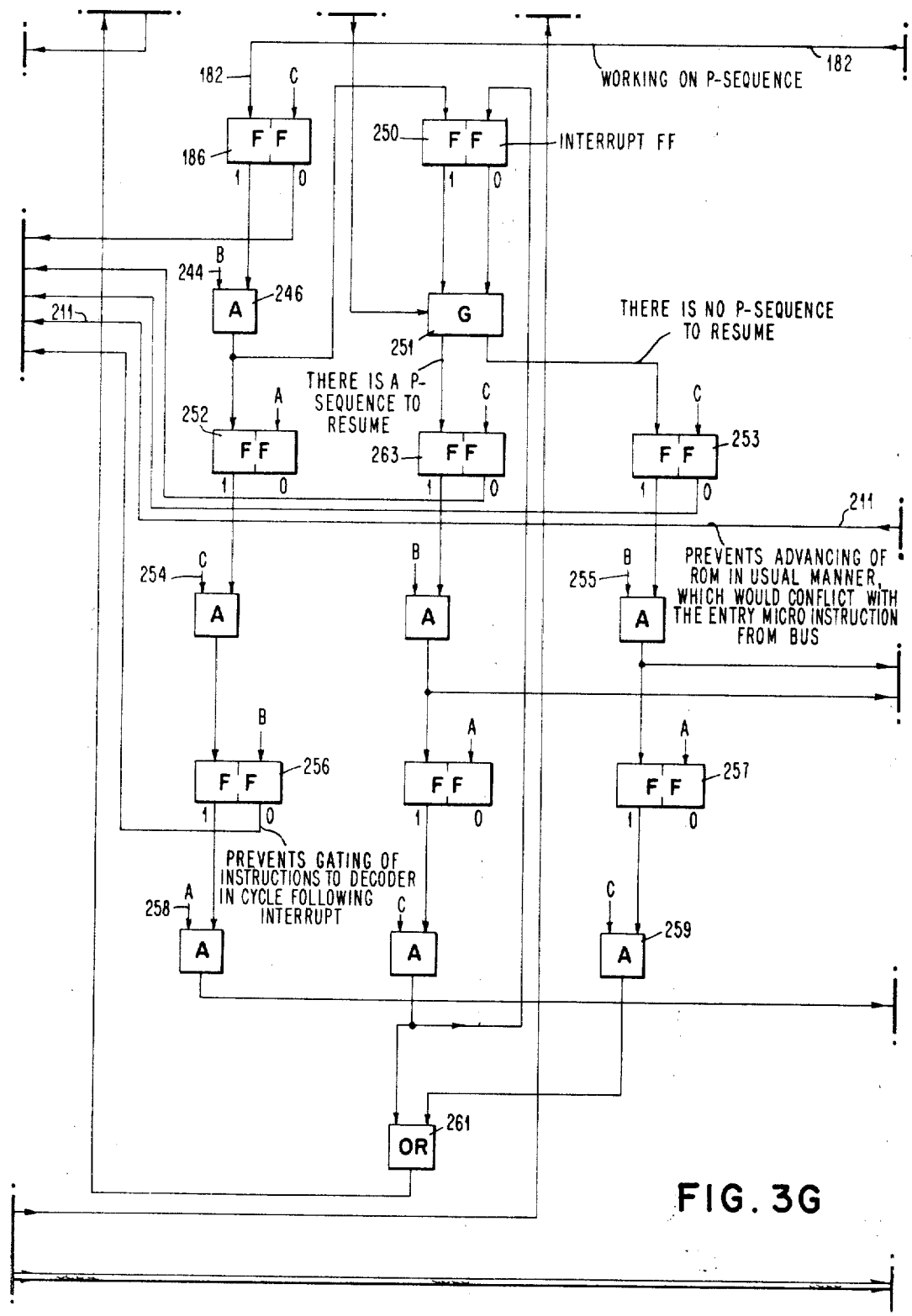
Figure 3H:
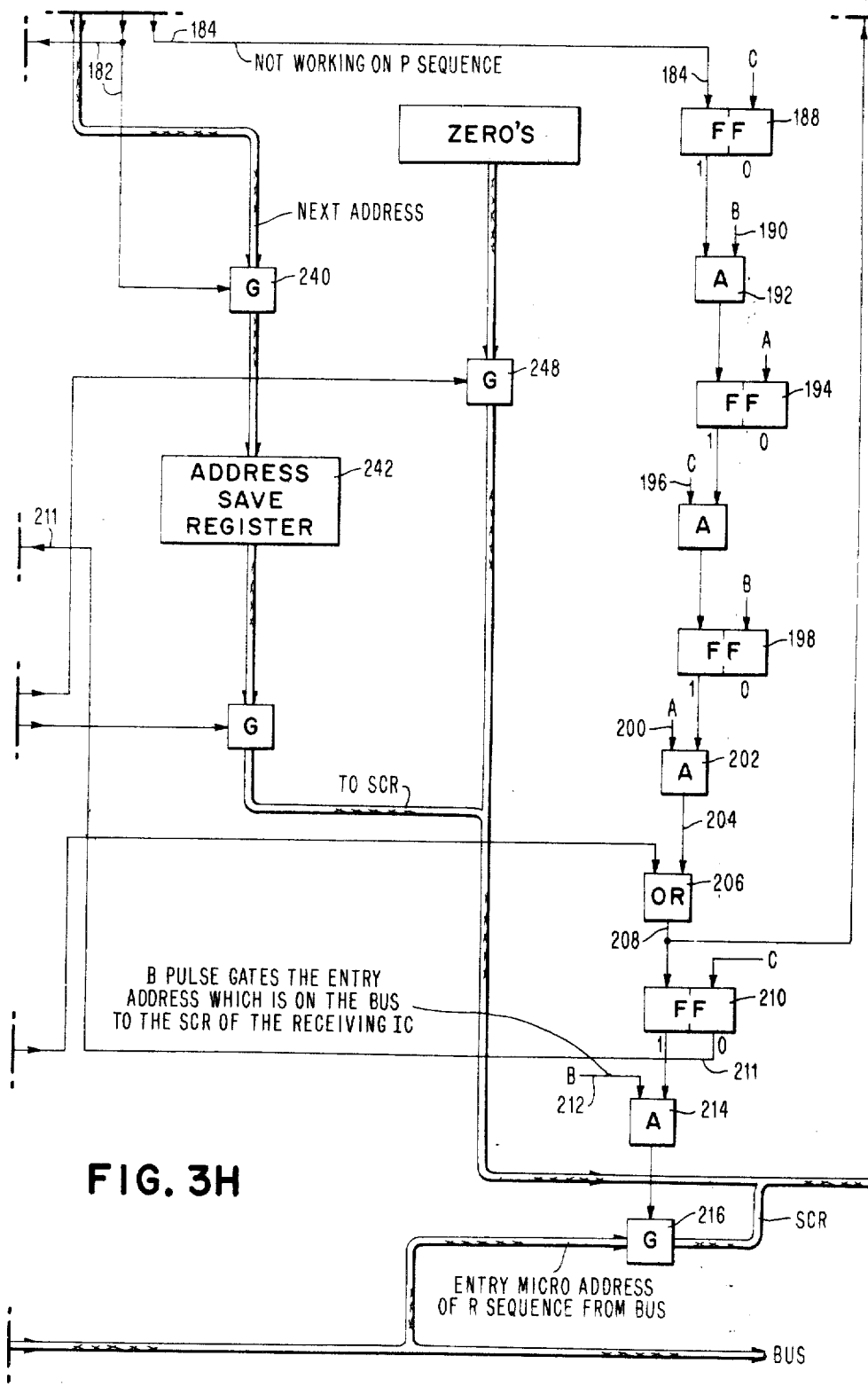
Figure 31:
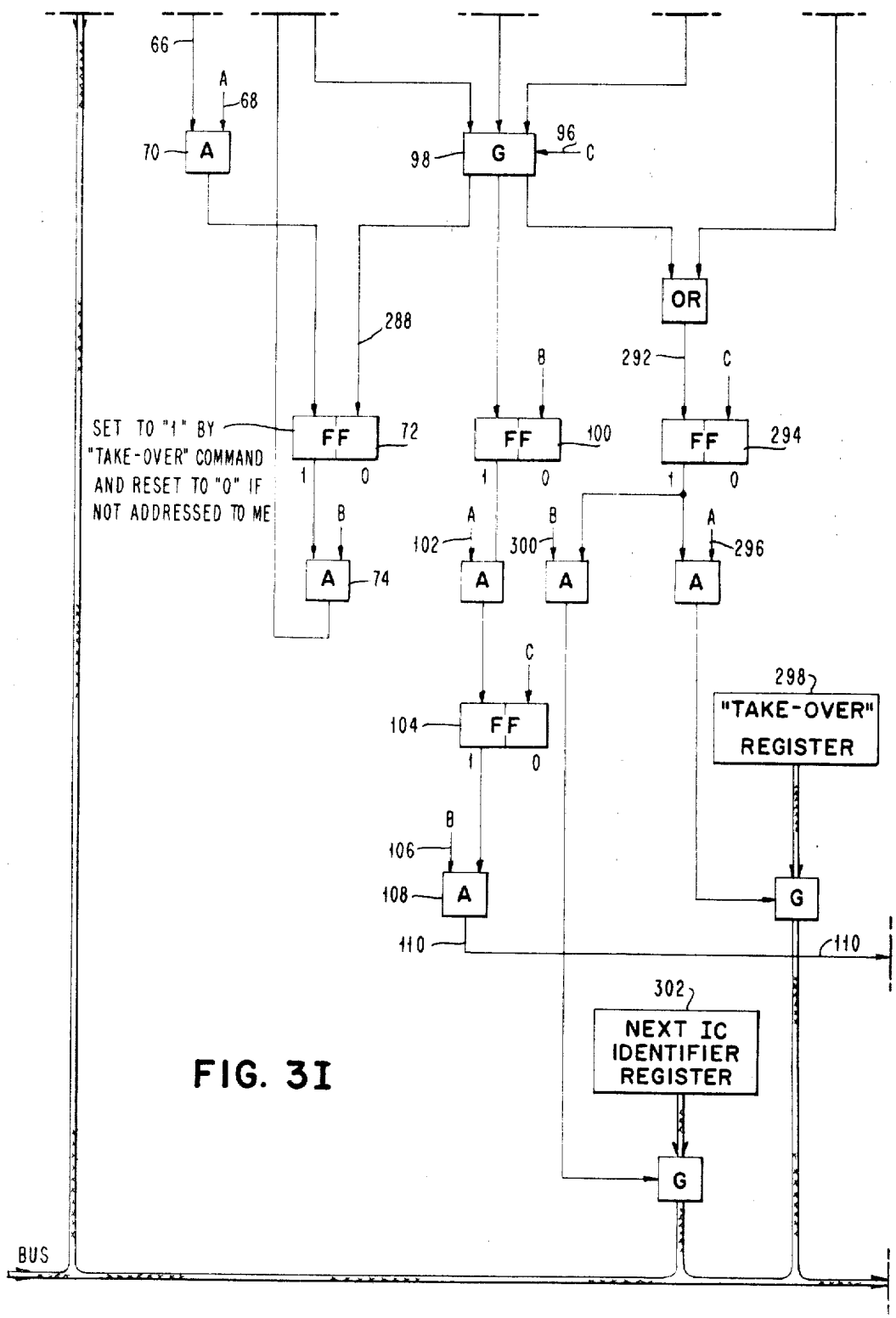
Figure 3J:
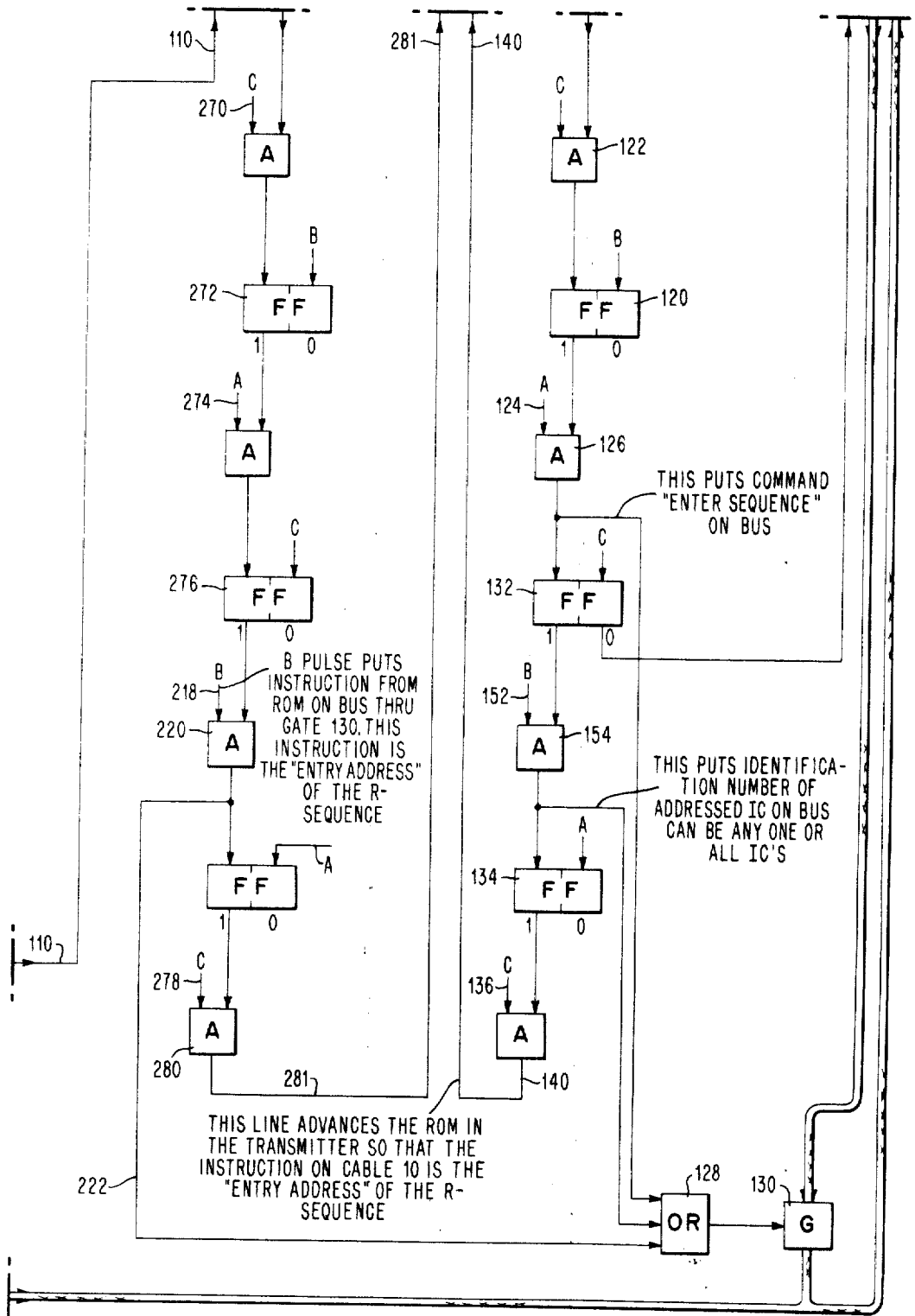

FIGS. 3a–j constitute a logical schematic diagram of an Interaction Controller as shown on FIGS. 1 and 2.

Figure 4:
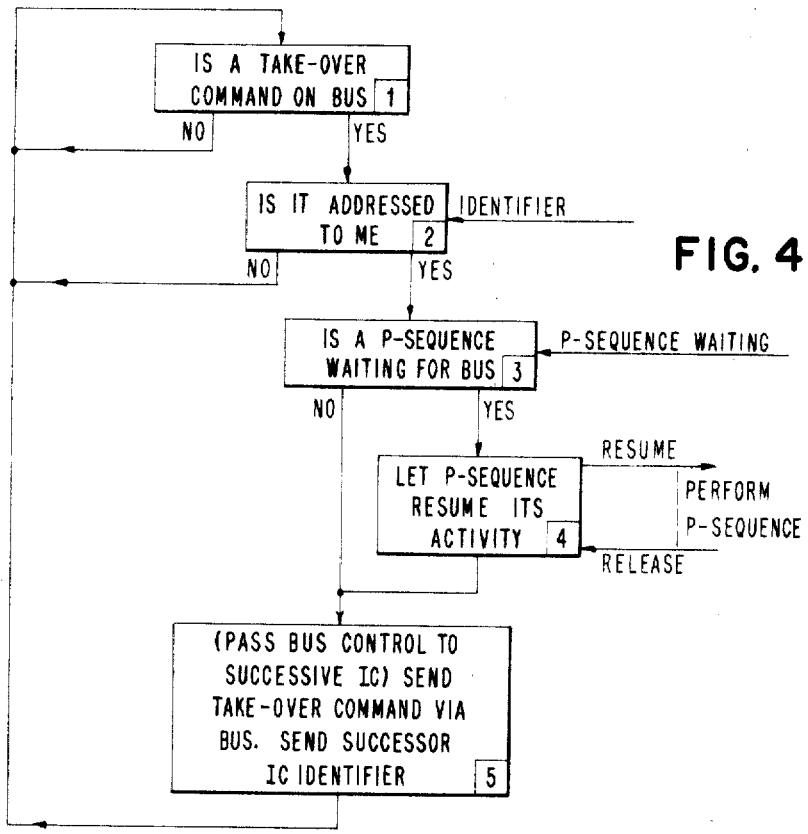

FIG. 4 is a flow chart showing a "Bus Control Sequence" as performed by an Interaction Controller.

Figure 5:
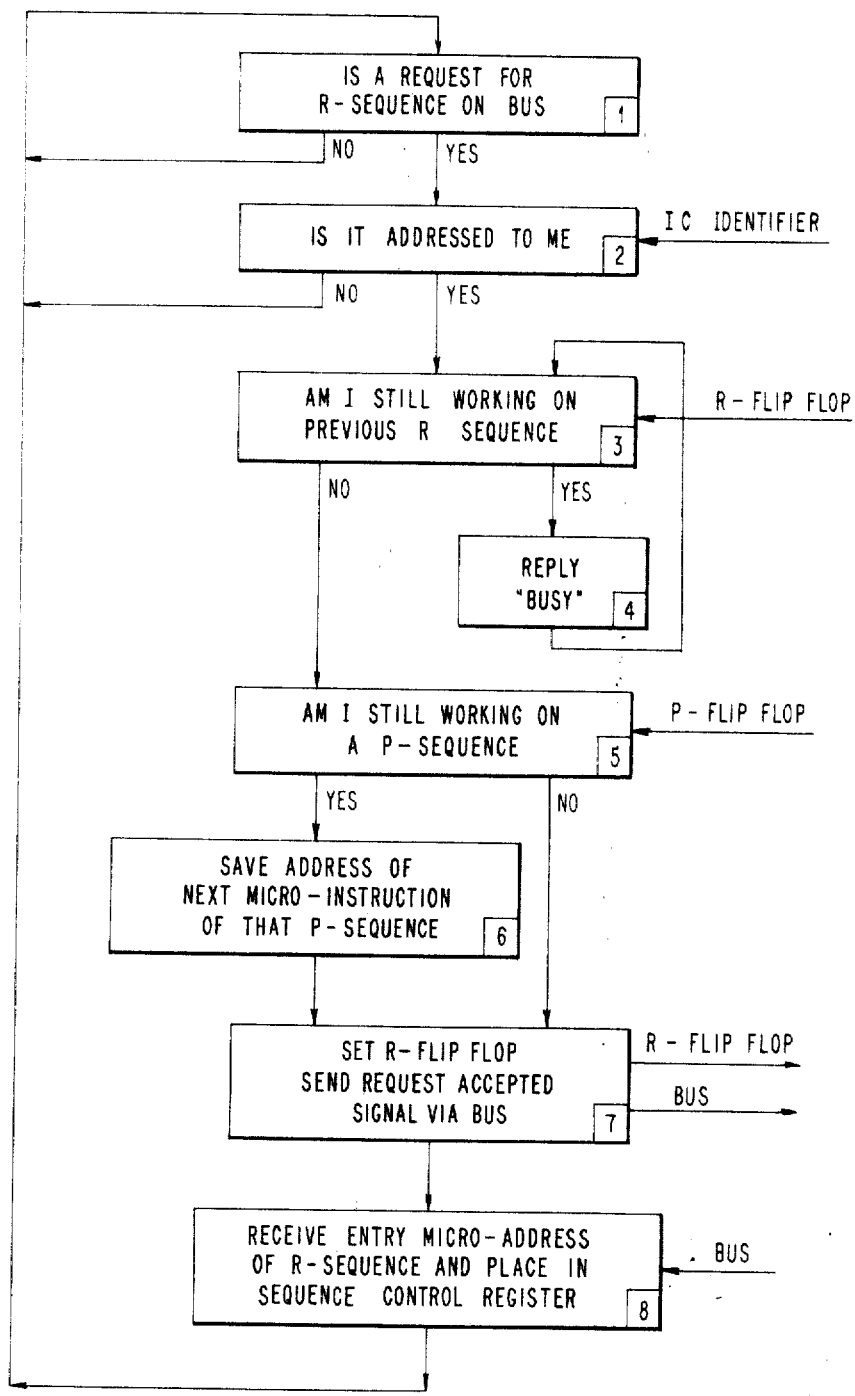

FIG. 5 is a flow chart of a "Request Identification Sequence" as performed by an Interaction Controller.

FIG. 6 is a flow chart of a "P-Sequence" as performed by an Interaction Controller under direction of its individual Processor.

Figure 7:
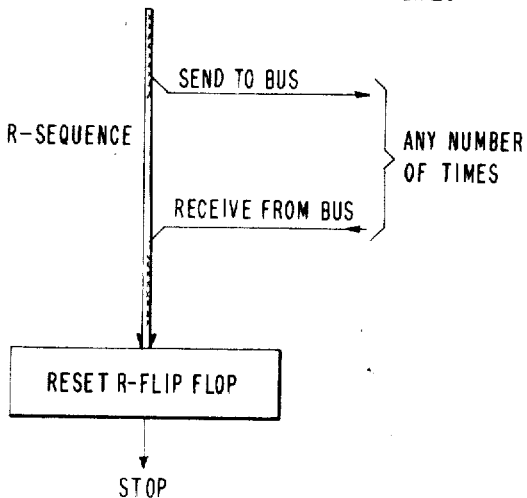

FIG. 7 is a flow chart of a "R-Sequence" as performed by one of the Interaction Controllers.

DETAILED DESCRIPTION OF DISCLOSED EMBODIMENTS

As stated previously in the specification, the present invention comprises a novel multiprocessor system control mechanism wherein each of the individual processors is associated with a separate control unit designated herein as an Interaction Controller which is capable of interacting both directly with its own processor and directly with other Interaction Controllers belonging to other Processors within the system. This overall arrangement may best be understood by referring to the functional block diagram of FIG. 1 wherein it will be seen that each Processor 1 through N is connected directly to its associated Interaction Controller (IC) while all Interaction Controllers are connected directly to the Interaction Bus. From this diagram it may be seen that the individual Processors are not able to talk directly to each other but are able through their individual Interaction Controllers to accomplish this function. The following description of the detailed embodiment shows the circuitry necessary for the communication and control functions of this interaction system.

Referring to FIG. 2, the main components of an individual Interaction Controller are indicated in outline. It will be noted that above the dotted box representing the Interaction Controller per se a communication cable is shown linking the Controller to its associated Processor. Another connection is shown coming out of the bottom of the Controller onto the Interaction Bus. Individual connections between the four boxes within the dotted rectangle are not shown as many of their functions are interrelated and a good deal of the circuitry, performing parts of the various functions shown, is common as will be apparent from the detailed description of FIG. 3. The box entitled Read Only Memory represents, as the name implies, non-erasable storage holding the various control sequences for the Interaction Controller. This information may be accessed by providing the appropriate address to the Interaction Controller Address Register. It will be clear that the sequence control information may be incorporated in the IC in forms other than a Read Only Memory without departing from the spirit of the invention.

The box marked Bus Control represents certain procedures that must be followed in order for the IC to take over control of the bus. In the present embodiment, control of the bus passes in a sequential fashion to the various IC boxes and an IC can only take over control of this bus when it receives the appropriate signal from its predecessor IC. When an IC encounters a "take over bus" signal that is intended for it, it decides whether it can in effect utilize the bus. If so, it will take control of the bus, otherwise it passes control to its successor in the "round robbin" sequence of bus control. This sequence of bus control is established by the supervisor program. This is effected by inserting the identification number of each IC into the appropriate register of its predecessor in the round robbin currently in force. The supervisor is also capable of changing this sequence in the course of system operation. This becomes necessary for instance when a processor is added to or removed from the active system. However, these and other functions comprising Bus Control will be described in more detail subsequently.

The block marked Receiver Request Circuitry applies to that portion of the IC unit which must operate to notify other IC units that one or several of same are required to perform a control sequence on behalf of the IC unit having control of the Bus. It is the Receiver Request circuitry which sends out the request for a receiver sequence (R-sequence) and then listens on the bus to determine if the requested receiver IC has answered back that it has accepted the request and is ready to perform the requested operation.

The block entitled Request Identification Circuitry refers to that portion of the IC circuitry which constantly monitors the bus for commands addressed to itself by some other IC unit, and which subsequently notifies the requesting IC unit by means of a signal transmitted over the bus that it has heard the request and is capable of performing the operation to be requested.

Before proceeding with the detailed description of the operation of the system as set forth in the detailed logical schematic diagram of FIG. 3, the flow charts for the various sequences to be encountered within the individual IC units as shown in FIGS. 4 through 7 will be described in general terms. First, however, a number of definitions should be set forth together with the rules that govern operation of the present embodiment. The term P-sequence designates a sequence of instructions executed by an IC unit upon initiation by that unit's Processor. By definition a P-sequence is always called by the Processor associated with the IC unit considered.

An R-sequence (Receiver Sequence) on the other hand is always called by appropriate instructions executed by another IC unit. As usual in programming ordinary computers, sequences are designated by the address of the Read Only Memory word which contains the initial instruction of the sequence. These entry addresses are known to each individual processor (in case of a P-sequence) and to the requesting processor (in case of an R-sequence).

The following general rules apply to the presently embodied system. Only a P-sequence is able to sieze the bus and thus request subsequent R-sequences in other IC units. Once a P-sequence is begun within a given IC unit, that sequence must be completed before another P-sequence may be begun. However, it will be appreciated from the subsequent description that an individual P-sequence may be interrupted by an R-sequence requested by another IC unit. However, upon completion of that requested R-sequence the IC unit will then return to and complete the P-sequence interrupted. An R-sequence cannot by itself gain control of the bus although use of the bus may be necessary to the R-sequence. Since the requesting P-sequence will be in control of the bus, this P-sequence must make proper allowance for the use of the bus by the R-sequence requested. An R-sequence once in progress within an IC unit, must be completed before a subsequent request for an R-sequence can be accepted. This rule may result in the requesting IC unit having to wait or hold up the P-sequence in progress until the request for execution of the R-sequence can be accepted by the IC unit addressed.

With the above general rules and definitions in mind, reference will now be made to FIG. 4 which is a "Bus Control Sequence" flow chart. Block 1 in this flow chart indicates that the IC unit is continually listening to the bus for a take-over command. When such a command is recognized, the bus control circuits expect the identification of the IC units addressed to occur on the bus in the following time slot. In block 2 the IC decides whether the command was addressed to itself. The input to block 2 entitled Identifier is supplied by the control circuitry with the contents of a register representing the identification code assigned to the particular IC unit considered. If it is found that the take over command was addressed to the IC considered a test is made to determine whether a P-sequence is waiting for use of the bus (block 3). If the answer is "no," control of the bus is passed to the successor IC (block 5). To do so, the IC unit first transmits a take over command over the bus. Subsequently it transmits the identifier code of the successor IC that is of the IC unit which is to next have its turn at using the bus. If, however, a P-sequence is waiting for the bus, the IC unit being considered retains control of the bus, and the waiting P-sequence resumes its activity (block 4) requesting execution of an appropriate R-sequence in one or several of the other IC units as outlined previously. The manner in which this is done will be set forth in the description of the particulars of FIG. 3. It will be noted that when the P-sequence using the bus is through with same, it issues a "release" instruction which leads to block 5 passing control of the bus to the next IC unit in the bus usage sequence.

FIG. 5 is a flow chart of the "Request Identification Sequence." This flow chart represents the operation which each IC box continually performs in listening to the bus for request for an R-sequence addressed to the IC unit considered. Block 1 represents the function of continually comparing the bus with the code representing a request for an R-sequence. When this code is recognized, each individual IC unit must determine if this request is addressed to itself (block 2). This it does by comparing its own identifier code with the IC identifier code appearing on the bus, subsequent to the request code. The identifier of the IC considered is supplied by control from a register, as before, which is indicated as an input to block 2. If the request is found to be addressed to the IC considered, it must determine whether it is still busy on a previously requested R-sequence (block 3). If so, control passes to block 4 which returns a "busy" signal to the requesting IC by way of the bus. Upon receipt of a busy signal the requesting IC waits until this signal disappears, that is until the busy IC unit has completed the R-sequence in progress. When no R-sequence is in progress, the IC determines whether it is working on a P-sequence (block 5). If so, the P-sequence is interrupted by saving the address of the next micro-instruction of that P-sequence in a register provided for that purpose so that, once the requested R-sequence is completed, the unit may return to the P-sequence interrupted. This operation is shown in block 6. Block 7 represents the acceptance of the request. It will be entered after the IC has determined that a P-sequence is either not in progress or that it has been properly interrupted. At that point a "Request Accepted" signal is sent back via the bus to the requesting IC, and the R-flip-flop of the IC considered is set, which records the fact that it is now busy on an R-sequence. Upon receipt of the "Request Accepted" code the requesting IC will transmit the entry micro-address of the requested sequence over the bus to the receiving IC unit which will cause the requested R-sequence to be initiated.

A P-sequence flow chart is shown in FIG. 6 wherein the upper most block is designated as the processor that is the source of the P-sequence address designating the P-sequence to be initiated by the associated IC unit. When the Processor requests a P-sequence by activating the P request line to block 1, its associated IC unit determines (block 1) whether it is still working on another P-sequence. That may have been initiated by the processor prior to the one being considered. If it is, the IC rejects this request and a rejection signal is sent back to the processor (block 2). If the IC is not engaged in a P-sequence, the IC determines (block 3) whether it is still working on any R-sequence. If the answer is "yes," control returns to block 2 causing the request for a P-sequence to be rejected by the IC unit. If, however, the IC is not busy at all, the request is accepted by sending back a "request accepted" signal to the Processor. Upon accepting a P-sequence request, the IC furthermore records the fact that it is now busy on a P-sequence by setting its P-flip-flop (block 5). Thereafter control proceeds to block 6 which represents the initialization of the P-sequence requested. This involves placing the entry address of the requested P-sequence that is presented by the processor into the sequence control of the IC unit whereafter the latter takes over in actually executing the P-sequence. This is indicated below block 6, showing schematically in which manner a P-sequence may interact with the Bus Control circuitry of its IC. The upper portion may be any sequence of instructions that can be executed solely within the IC unit. Following this is shown the execution of a "Request R-sequence" instruction. At this point the IC unit must "wait" until control of the bus is turned over to it by its predecessor IC and the dotted line indicates the time spent in waiting. Assuming then that the IC unit considered is given control of the bus, a "resume" signal sent by Bus Control to the waiting sequence control of this IC unit which may now proceed in its P-sequence by executing the "Request R-sequence" instruction. This will result sooner or later in one or several other IC units performing the R-sequence requested, in the course of which signals may pass back and forth between the requesting and the requested IC units by way of the bus. At the point where the requesting P-sequence does not expect any further use of the bus either by responses from R-sequences that if requested earlier or by itself for requesting additional R-sequences, it will issue the instruction "Release Bus," which causes Bus Control of the IC unit being considered to pass control of the bus to its successor IC.

FIG. 7 is representative of the operation of an R-sequence showing a schematic chart. The upper part of this figure indicates that the R-sequence is "initialized by a micro-address from transmitter IC." This indicates that the actual R-sequence is started by accepting the micro-address in the Read Only Memory transmitted by the requesting IC by way of the bus and inserting it into the sequence control mechanisms of the receiving IC which causes the memory to read out instructions to its data register which instructions will be decoded and carried out by the IC control circuitry. The two lines labelled "send to bus" and "receive from bus" indicate that during an R-sequence the receiving IC unit has continuous connection with the bus for communication with the transmitting IC unit and depending upon the particular R-sequence requested actual use of the bus may vary considerably. Termination of an R-sequence causes the R flip-flop to be reset. At this point the IC unit will either remain idle, or resume a prior P-sequence at the address that has been stored in the Save Register. Only when the IC unit is idle will it be in a position to accept a new P-sequence from its own processor.

The chronological relationship between a P-sequence in a transmitting IC and an R-sequence in a receiving IC is illustrated in the accompanying Table I. The logical components appear on FIGS. 3a–j. The P sequence is shown at the left and the R sequence at the right. The example illustrated shows how a P-sequence which is initiated by a processor may go through a few instructions until it comes to the instruction "Wait for Bus." It may be easier to first read the description of FIGS. 3a–j before considering the following explanation. The P-sequence will then stop because F.F. 60 is set to "1" which means that AND circuit 14 will be disabled which will prevent the address of the next instruction from being gated to the SCR. When the IC executing the P-sequence gains control of the Bus it will execute the instructions "initiate request for R-sequence." This instruction starts a chain of events beginning with the setting of F.F. 114 to its "1" state which causes the command "Enter Sequence" to be put on the bus at A time in the next cycle and which causes the ID of the receiver to be put on the Bus at B time in the same cycle. The receiver that is addressed sets its F.F. 162 and, at C time in the same cycle, the R F.F. is tested by enabling gate 168. If the receiver is working on a previous R-sequence, F.F. 226 is set so that at A time on the next cycle a busy signal is put on the Bus. The transmitter listens for this busy signal because its F.F. 138 is set and as long as a busy signal comes back AND circuit 249 will not be satisfied when it is tested at A time. The transmitter waits with the instruction "Entry Address of R-sequence" on cable 10 until it does not get a busy signal or, in other words, until line 262 from the compare unit 80 becomes active. The reason it waits is because both AND circuits 14 and 20 are disabled because F.F. 138 is in its "1" state. Nothing happens in the transmitter until the cycle after the cycle in which the R F.F. is set to "0." In this cycle which follows the cycle in which the R F.F. in the receiver is set "0" AND circuit 249 will have an output to set F.F. 264 to "1."

TABLE I

| | Typical P-Sequence | | Typical R-Sequence |
|---|---|---|---|
| Instruction (Cable 10) | Address of next instruction Cable 12, first from Processor) | Instruction (Cable 10) | Address at next instruction (Cable 12, except as otherwise noted) |
| (*). | | | |
| Wait for Bus. | | | |
| Initiate Request for R-sequence. | | | |
| Enter Sequence. | | | |
| I.D. # of Receiver. | | | |
| Entry Address of R-sequence. | | | Address of first instruction of R-sequence from transmitter-Interaction Controller. |
| Transmit contents of Register at A time & listen at B time. | | Compare Register with bus & answer if equal. | |
| | | (*). | |
| Release Bus. | | R-sequence complete. | |
| (*). | | | |
| P-sequence complete. | | | |

*One or more miscellaneous operations.

TABLE II

| | Transmitter | Receiver (two possible paths) | |
|---|---|---|---|
| | | With a P Sequence | With No P Sequence |
| A | FF 264→"1" | FF 186→"1" | 188→"1" |
| B | FF 268→"1" | {FF 250→"1"<br>FF 252→"1"} 194→"1" | |
| C | FF 272→"1" | FF 256→"1" | 198→"1" |
| A | FF 276→"1" | FF 210→"1" | |
| B | FF 278→"1" (Entry Address put on bus). | Gate Bus to SCR | |
| C | FF 138→"0" (Advance ROM). | | |

The above Table II shows the sequence of events in both the transmitter and receiver for the two cycles following the cycle in which the "R" F.F. was set to "0."

The main control in the "Interaction Controller" is the Read Only Memory shown at the top left of the diagram. This Read Only Memory, for example, could be a diode matrix which is addressed by the "Sequence Control Register." The SCR would contain a binary number which is decoded by the decoder. The output of the decoder would be a single line which would place the instruction on cable 10. Each instruction carries with it the address of the next instruction which would appear on cable 12. The timing in the machine is sychronous. A pulse generator is provided which delivers three pulses on separate lines. These pulses are labelled A, B, and C. The instruction is read from the Read Only Memory at A time by the pulse applied to AND circuit 14. The output of AND circuit 14 enables the Gate 16 which gates the instruction to the decoder 18. The address of the next instruction is gated to the SCR at B. time. This is normally accomplished by the B pulse supplied to AND circuit 20, the output of which extends through the OR circuit 22 to the gate 24 which gates the address of the next instruction on Cable 12 to the SCR. When all 0's are placed in the SCR the line 26 from the decoder becomes active. The only purpose of line 26 is to inhibit succeeding B pulses applied to AND circuit 20. This is done by making one input of AND circuit 20, the output of the invertor 28.

P-sequence

At the top left corner of the diagram there are two flip-flops labelled P and R respectively. The P flip-flop is set to "1" when the Interaction Controller is operated on what is called a P sequence. This means that the sequence is initiated by the processor associated with the Interaction Controller. The R flip-flop is set to "1" when the Interaction Controller is operated on a "receiver sequence." R-sequences are initiated by some other Interaction Controller which must be doing a P-sequence. The initiation of a P sequence will first be described.

The P sequence is initiated by a pulse on line 32. This sets flip-flop 34 to its "1" state. This pulse on line 32 would come at A time. Because of this, flip-flop 34 can be sampled at A time by a pulse on line 36, AND circuit 38 will be enabled and will apply a pulse to Gate 40. It is assumed that both P and R flip-flops are initially set to their "0" state. AND circuit 42 will thus be enabled and the result of the pulse applied on line 36 will be a pulse on line 43 which sets flip-flop 44 to its "1" state. Flip-flop 44 is next sampled at B time by the pulse on line 46 which provides one input to the AND circuit 48 the other input being provided by the "1" side of flip-flop 44. The output of AND 48 sets the P flip-flop to its "1" state. The pulse on line 46 is also effective to gate the entry address, which is the address of the first instruction of the P sequence, from cable 50 to cable 52 which extends to the SCR. This will cause the first instruction to appear on cable 10 and the address of the next instruction to appear on cable 12. At C time, flip-flop 44 is reset to its "0" state. Flip-flop 34 is also reset to "0" at C time.

If either the P or the R flip-flop were set to "1" the OR circuit 54 would have an output on line 56 which extends back to the processor and tells it that the request has been rejected. The process or must then continue to repeat the request on line 32 until the Interaction Controller can accept it. It will be noted that if the request is rejected that line 42 is not made active and the B pulse on line 46 is ineffective. When an Interaction Controller is executing a P sequence it may wish to communicate with other Interaction Controllers. The P-sequence must then have the instruction "Wait for Bus" inserted in its program. When this instruction is decoded, line 58 will become active and set flip-flop 60 to its "1" state. Nothing will happen now until the "Takeover" command comes from the Interaction Controller currently having control of the bus. It passes control of the bus over to the Interaction Controller which is waiting. This "Takeover" command comes from the bus at A time via cable 62. The "Takeover" decoder 64 will recognize this command and provide and output on line 66. At A time a pulse will be applied to line 68 and AND circuit 70 will have an output to set flip-flop 72 to its "1" state. The B pulse applied to AND circuit 74 will now be effective on line 76 to gate the Interaction Controller Identification Number in register 78 to the compare unit 80. At the time that the Interaction Controller relinquishing control of the bus sent the command "Takeover" at A time, it immediately followed this "Takeover" command with the Identification Number of the Interaction Controller which is next in line and this Identification Number appears on cable 82 from the bus. The output of the compare unit 80 will say whether or not the "Takeover" command is addressed to the particular Interaction Controller. For this particular case let it be assumed that it is addressed to the Interaction Controller shown on the wiring diagram. The compare unit 80 will have an output on line 84 which goes through the Gate 86 at B time. The wire 88 will be active and this condition is applied to AND circuits 90 and 92. If the Interaction Controller is waiting AND circuit 90 will have an output to set flip-flop 94 to its "1" state. This happens at B time. At C time a pulse on line 96 is applied to Gate 98 and the set condition of flip-flop 94 will be used to set flip-flop 100 to its "1" state. The next A pulse is applied to line 102 which sets flip-flop 104 to its "1" state. Flip-flop 100 is then reset by the next B pulse. At B time a pulse is applied to line 106 which causes AND circuit 108 to have an output on line 110 which is used to set the "wait" flip-flop 60 to its "0" state. It will be noted that when flip-flop 60 was switched to its "1" state that the AND circuits 14 and 20 were disabled. When flip-flop 60 is reset to its "0" state, the next A pulse is effective to gate the next instruction to the decoder.

The next instruction in the P-sequence can be "Initiate Request for R-sequence." This is possible now because the Interaction Controller is allowed to use the bus because the control has been passed to it by the preceding Interaction Controller. Line 112 will now become active and set flip-flop 114 to its "1" state. At B time a pulse will appear on line 116 and flip-flop 118 will be set to its "1" state. At C time flip-flop 120 will be set to its "1" state by the output of the AND circuit 122. In the next machine cycle an A pulse can appear on line 124 and AND circuit 126 will have an output which extends through the OR circuit 128 and will be effective to enable the Gate 130 in order to put the command "enter sequence" on the bus.

It is necessary to delay the P-sequence at least one machine cycle because it is necessary to find out whether or not the addressed Interaction Controller is busy. This is accomplished by flip-flops 132 and 134. Flip-flop 132 enables AND circuit 154 and at B time the Identification Number is put on the bus. The Identification Number appeared as an instruction because of the B pulse applied to AND circuit 20. The C pulse at the end of this machine cycle is applied to line 136 and it sets flip-flop 138 to its "1" state. The pulse on line 136 also extends via line 140 to set flip-flop 114 to its "0" state and also via OR circuit 22 to Gate 24 which gates the address of the next instruction to the SCR. This instruction is the entry address of the R-sequence.

In the manner just described the command "enter sequence" is gated to the bus by Gate 130. It is now on the bus and available to all other Interaction Controllers. It should be mentioned that the command "enter sequence" was put on the bus at A time and immediately followed at B time with the Indentification Number of the Interaction Controller to which it is addressed.

All Interaction Controllers receive this "enter sequence" from the bus at A time. This command is decoded by the "enter sequence" decoder 142. Thus, if decoder 142 is sampled at A time by a pulse on line 144, flip-flop 146 will be set to its "1" state. In other words, every receiving Interaction Controller will have its flip-flop 146 set to a "1." However, only one of these receiving Interaction Controllers will be the one that is addressed and this will be ascertained at B time, by a pulse on line 148. It will be noted that the Interaction Controller Identification Number is contained in Register 78. This number is gated to the compare unit 80 under control of wire 150 which extends from the "one" side of flip-flop 146. As previously mentioned, the identification number of the receiver Interaction Controller is on the bus at B time. This is done by the B pulse applied to line 152 which extends through AND circuit 154 to the OR circuit 128. The output of OR circuit goes to Gate 130 which puts the next instruction on the bus and this next instruction is the identification number of the addressed Interaction Controller. With the identification number on the bus at B time it will be compared with the identification number in register 78 and if they agree, the compare unit 80 will have an output on line 84 which extends to the right through OR circuit 156, line 158 to AND circuit 160. Thus, at B time, the pulse on line 148 will cause AND circuit 160 to have an output if it is the Interaction Controller addressed and this output of AND circuit 160 will set flip-flop 162 to its "1" state. If all Interaction Controllers were addressed, then the identification number would be "All Units" which would be sensed by its decoder 332, and the output would be used to set flip-flop 162 instead of the output of the compare unit. In other words the Interaction Controller which is addressed will set its flip-flop 162. It is necessary now to find out if the Interaction Controller addressed is working on a previous R-sequence. If it is working on a previous R-sequence, it is necessary to wait until the sequence is finished. The condition of flip-flop 162 is tested at C time by a pulse on line 164 to AND circuit 166. If flip-flop 162 is in its "1" state, AND circuit 166 will have an output which is applied to Gate 168. Gate 168 tests the condition of the R flip-flop. If the R flip-flop is on "1," Gate 168 will have an output on line 170. If the R flip-flop is on "0" which means that the Interaction Controller is not working on a previous R sequence, line 172 will be effective to set flip-flop 174 to it "1" state. In the next cycle it is necessary to test to see whether the Interaction Controller is working on a P-sequence. This is done by testing the condition of the flip-flop at A time. At A time in the next cycle a pulse applied to line 176 will cause AND circuit 178 to have an output because flip-flop 174 is in its "1" state. This output is applied to Gate 180 which will have an output on line 182 if the Interaction Controller is working on a P-sequence or an output on line 184, if the Interaction Controller is not working on a P-sequence. An output on line 182 will set flip-flop 186 to its "1" state. An output on line 184 will set flip-flop 188 to its "1" state. If the Interaction Controller is not working on a P-sequence, it can immediately accept the "enter sequence" and this is done by a pulse on line 190 to AND circuit 192. The other input to 192 is the "one" side of flip-flop 188. The output of AND circuit 192 will set flip-flop 194 to its "1" state. This is tested by a C pulse on line 196 which in turn will set flip-flop 198 to its "1" state. The A pulse in the next cycle, applied to line 200 samples flip-flop 198 and, in this case, the AND circuit 202 will have an output on line 204 which extends through OR circuit 206 to the line 208. Line 208 will set flip-flop 162 back to its "0" state and the R flip-flop to its "1" state. Line 208 also sets flip-flop 210 to its "1" state. Flip-flop 210 is sampled at B time by the pulse on line 212 and causes AND circuit 214 to have an output to Gate 216. Gate 216 gates the entry address of the R sequence, which is on the bus, to the SCR. Because the line 211 is not active at this time, the usual advance of the Read Only Memory (cable 12) (Gate 24 to SCR) is prevented. It should be remembered that at the time that B pulse appears on line 212 of the receiving Interaction Controller that a similar (in time) B pulse appears on line 218 of the transmitting Interaction Controller and this will be explained in more detail later. In the transmitting Interaction Controller, AND circuit 220 will have an output on line 222 which extends to OR circuit 128. The output of OR circuit 128 is used to enable Gate 130 which puts the entry instruction on the bus. In other words, the B pulse applied to line 218 in the transmitting Interaction Controller is used to ready the entry address from the Read Only Memory to the bus via Gate 130 and once on the bus it is picked up by the Gate 216 and is entered into the SCR of the receiving Interaction Controller.

Going back to Gate 168, this gate would have an output on line 170 if the receiving Interaction Controller is working on a previous R-sequence. The output on line 170 is used to set flip-flop 226 to its "1" state. Flip-flop 226 is then sampled at A time in the next cycle by a pulse on line 228. AND circuit 230 will then have an output which is applied to Gate 232 in order to put a busy signal on the bus. The "busy" code is contained in Register 234. It is next necessary to regard the busy code register 234 as the one in the transmitter. At the transmitter it is necessary to compare the busy code register with the busy code coming from the bus and this is done by compare unit 80. It will be remembered that flip-flop 138 was previously set to its "1" state and line 236 will be active to enable Gate 238. If at the transmitter end, a busy signal is detected, compare unit 80 will have an output on line 84 which is ineffective at this time because the transmitter is waiting for an unequal output of compare unit 80. In other words, the existence of an unequal condition will indicate to the transmitter that the receivers are not busy or not working on a previous R-sequence. As long as the receiving Interaction Controller is busy, Gate 168 in the receiver will have an output on line 170 at C time which will set flip-flop 226 to its "1" state so that when tested on the next machine cycle by the A pulse on line 228 a busy signal will be sent to the transmitter.

Considering still the receiving Interaction Controller, when its R sequence is completed, the decoder 18 will have an output on line 240. Line 240 extends to gate 251 which tests the Interrupt flip-flop 250. If there is no P sequence to resume, flip-flop 253 will be set to "1" which will enable AND circuit 255 and disable gate 20. When the B pulse is applied to AND circuit 255, zeros will be gated to the SCR. Gate 20 is disabled to prevent the SCR being supplied from cable 12. The output of AND circuit 255 also sets flip-flop 257 to "1" which causes the C pulse applied to AND circuit 259 to be effective through OR circuit 261 to set the R flip-flop to zero.

If there is a P sequence to resume flip-flop 263 will be set to "1." This will result in the saved address which is in register 242 to be gated to the SCR. At C time, the R flip-flop will be set to "0." The circuits described permit an interrupted P sequence to be resumed and to execute at least one instruction before it is interrupted again. With the R flip-flop on "0," when it is tested at C time, by the pulse on line 164, Gate 168 will have an output on line 172 as previously described.

The next thing to be explained is the sequence of events when the receiving Interaction Controller is working on a P sequence. If this is the case, it is necessary to interrupt this P sequence and store the next address of this P sequence in an "address save register" 242. This sequence is initiated by a pulse at A time on line 176 which is applied to AND circuit 178, the output of which will enable Gate 180. This time, Gate 180 will have an output on line 182 which will set flip-flop 186 to its "1" state, and enable Gate 240 which gates the next address from the Read Only Memory to Register 242. The output of AND circuit 246 is also effective to set flip-flop 250 to its "1" state and flip-flop 252 to its "1" state. Flip-flop 250 is used to indicate that the P sequence has been interrupted and that it will be necessary at a later time to resume the P sequence. Flip-flop 252 is used to cause a C pulse on line 254 to be effective to set flip-flop 256 to its "1" state. Flip-flop 256 in turn is used to enable an A pulse on line 258 to be transmitted through OR circuit 206. The output of OR circuit 206 is the same as previously described. The output of OR circuit 206 is used to reset flip-flop 162, to set the R flip-flop to "1" and to gate at B time the entry micro address of the R sequence to the SCR of the receiving Interaction Controller.

Going back to the signal on line 164, at C time in the first cycle that an output appears on line 172 it is stored in flip-flop 174 to be tested by the A pulse in the next machine cycle on line 176 in the receiving Interaction Controller. At the same time, an A pulse appears on line 260 in the transmitting Interaction Controller. It will be noted also that line 262 at this time will be active in the transmitting Interaction Controller because compare unit 80 has an unequal output. In other words, the busy register does not agree with the bus which no longer has a busy signal thereon. The pulse this time on line 260 is used to set flip-flop 264 to its "1" state. This allows the B pulse on line 266 to set flip-flop 268 to its "1" state. This in turn allows the C pulse on line 270 to set flip-flop 272 to its "1" state. The cycle to be next described is the machine cycle following the machine cycle when no busy signal was received by the transmitter. In this cycle it is necessary to have the entry address of the R sequence on the bus so that the R sequence can be started in the receiving Interaction Controller. This is done by first applying an A pulse to line 274 which is used to set flip-flop 276 to its "1" state. As described previously, the B pulse on line 218 is now effective on line 222 to gate the entry address from the Read Only Memory to the bus. Following the B pulse on line 218 a C pulse is applied to line 278 and this effective through AND circuit 280 and line 281 to set flip-flop 138 back to its "0" state. The same C pulse extends via line 283 and OR circuit 22 to gate the address of the next instruction to the SCR. It will be noted that when flip-flop 138 goes back to its "0" state that line 282 will again become active to enable Gates 14 and 20 so that the Read Only Memory can function in its normal manner.

Going back to the time when a "Takeover" command on the bus was described, it will be remembered that the "Takeover" decoder 64 had an output on line 66 which, at A time, enabled AND circuit 70 to have an output which set flip-flop 72 to its "1" state. At B time in that cycle AND Circuit 74 was used to enable Gate 86. Now if Gate 86 has an output on line 284 the Interaction Controller knows that the "Takeover" command was not addressed to it and this will set flip-flop 286 to its "1" state. At C time a pulse on line 96 would enable Gate 98 and this time Gate 98 would have an output on line 288 which would merely go back and set flip-flop 72 to its "0" state. In this way the Interaction Controller knows that the "Takeover" command was not meant for it.

Go back to the condition where the previous Interaction Controller passes on the control to the next one and the next one is not waiting. In this case the "wait" flip-flop 60 would be in its "0" state which would enable AND circuit 92 and allow the output of Gate 86 which is on line 88 to set flip-flop 290 to its "1" state.

When the C pulse is applied to line 96 Gate 98 has an output on line 292 which would set flip-flop 294 to its "1" state. This permits an A pulse applied on line 296 to gate a new "Takeover" command from register 298 to the bus at A time and at B time a pulse on line 300 will gate the next Interaction Controller Identification register 302 to the bus. In this manner, the Interaction Controller, that is not waiting, passes on the control of the bus to the next one in line.

At some time in the R sequence it might be necessary to compare some register with the signal on the bus coming from the transmitter and answer back to the transmitter if this number on the bus is equal to some register in the receiver. In the receiver, the instruction, when decoded, would bring up line 304 which would gate register 306 to the compare unit 80. This would happen at A time. The pulse on line 304 would also be effective to set flip-flop 308 to its "1" state. If compare unit 80, at B time, has an equal output on line 310 it will set flip-flop 311 to its "1" state. The "1" side of flip-flop 311 will enable AND circuit 312 so that a B pulse on line 312 can get through to gate the answer register 314 to the bus through Gate 316. This answer register 314 would merely say "yes." At the same time that this sequence is occurring in the receiving Interaction Controller the transmitting instruction would be decoded on line 318 because the instruction at this time is "transmit contents of register at A time and listen at B time." When line 318 in the transmitter becomes active at A time, it gates register 320 to the bus through Gate 322. At the same time flip-flop 324 is set to its "1" state. At B time, in the transmitter, a pulse on line 326 is used to enable Gate 238 which gates whatever is on the bus could be the contents of register 314 in the receiving Interaction Controller.

It should perhaps be noted that when a particular Interaction Controller has decoded a "Request for R sequence" in another Interaction Controller it may also be desired to address all Interaction Controllers rather than a specified Interaction Controller. In this event the special "all units identifier" signal mentioned previously is sent out by the transmitter. This is detected by the Decoder 332 whose output passes through OR circuit 156 which in turn brings up line 158 and initiates the R sequence in the receiver. Thus the "equal" line 84 from compare circuit 80 does not need to be activated. More specifically, the Identification Number which is put on the Bus at B time, in the same cycle that the "Enter Sequence" command is put on the bus at A time, can be the "All Units" number. To prevent a transmitting Interaction Controller from addressing itself, the "0" output of flip-flop 132 is made one input of AND circuit 160.

CONCLUSIONS

From the above description of the disclosed embodiment it will be seen that the present control mechanism in the form of separate Interaction Controller for each processor or processor unit of a multiprocessor system considerably extends the power and overall speed of the system without greatly increasing the cost thereof. It will readily be appreciated that the individual Interaction Controllers are capable of working in parallel with their associated processors on tasks independent of those concurrently executed by their associated processors and that they are capable of calling when necessary on other Interaction Controllers and their related processors for various purposes as have been set forth. Thus, the potential for parallel operations of various control sequences or programs has been considerably enhanced, mainly as regards concurrent execution of user tasks in the processors and of execution tasks in the Interaction Controllers. Thereby numerous interruptions of the processors that would be required if the interaction system did not exist can be obviated. In addition, the interaction system permits one to eliminate a good deal of the main memory access cycles associated with one processor planting flags and other control information for the benefit of the other processors, and with repeated testing of these locations by these other processors.

While the disclosed system design represents what is considered to be a practical working embodiment it will readily be appreciated that very many modifications could be made by one skilled in the art. Thus, for example, instead of passing control or potential control of the interaction system bus in a sequential fashion from one Interaction Controller to a next designated Interaction Controller until all said Interaction Controllers have sequentially had an opportunity to use the bus and the cycle repeats, some other mode of operation may readily be conceived which might better suit the needs for a particular system application. Similarly, while an essentially synchronous timing control has been illustrated for the logic circuitry of the individual Interaction Controllers, it will also be appreciated that a more completely asynchronous timing system could equally well be utilized with appropriate circuit design changes to obtain essentially the same results. Also, a number or all of the functions which have been shown in the present embodiment as being implemented in the form of control sequences stored in the Read Only Memory might obviously also be directly implemented in the form of switching circuits if it were found that they were used with sufficient frequency to warrant such implementation. Conversely, certain of the control functions here embodied in hardware might well be implemented as control sequences stored in a Read Only Memory. In both cases, however, the resulting operation of the system from the functional point of view would remain unchanged.

Thus, essentially the present control system allows the various Processors of a multiprocessor system to communicate with each other indirectly through the direct interaction of their associated Interaction Controllers. Thus, direct memory accesses for such interaction by means of interaction wiring conventional storage registers and the like is either obviated or significantly reduced. Such functions as queue lock out, queue access, stop working on task, find processor, highest or lowest priority, etc., are but a few of the various system instructions which such control mechanisms may very economically execute.

I claim:
1. In a multiprocessor system including a plurality of individual processor units the improvement which comprises an interaction control unit associated with each processor,
    means in each control unit responsive to commands from its individual processor to execute instruction sequences specified by its processor,
    means in each control unit to execute instruction sequences specified by other control units, and
    common-bus means connected to each of said control units whereby said control units may communicate directly and exclusively with each other over same whereby processor to processor intercommunication is accomplished via said control units and said bus means.

2. A multiprocessor system as set forth in claim 1, said system wherein said bus may be used only one control unit at any one time and including means for sequentially passing access to said bus to the various control units in said system.

3. A multiprocessor system as set forth in claim 2 wherein each control unit includes means for determining if said control unit requires said bus and
    means for actually taking control of said bus in response to said last named means when said unit's turn for access to the bus occurs.

4. A multiprocessing system as set forth in claim 3 including means in each control unit for passing access to said bus to the next control unit in the access sequence in response to means for determining that the control unit currently having access to said bus does not require same.

5. A multiprocessor computing system as set forth in claim 4 wherein each control unit includes means for addressing one or a plurality of the other control units over said bus.

6. A multiprocessor computing system as set forth in claim 5 wherein said addressing means includes means for transmitting an identifier code over said bus,
    means in each control unit for recognizing a transmitted identifier code, and
    means for indicating whether said control unit is in a condition to receive instructions from the transmitting control unit.

7. A multiprocessor computing system as set forth in claim 6 including means in each control unit for causing a transmitting control unit to temporarily hold any further execution of its current instruction sequence after it has addressed another control unit in the system and said other control unit has indicated that it is unable to currently perform any new instruction.

8. A multiprocessor computer system as set forth in claim 7 wherein each control unit includes an individual instruction sequence controller which causes certain processor sequences to be performed by the control unit upon request from the processor and certain receiver sequences to be performed by the control unit upon request by other control units.

9. A multiprocessor computer system as set forth in claim 8 wherein said sequence controller comprises a Read Only memory and associated access circuitry having storage space therein for storing a plurality of instruction sequences, wherein any sequence is enterable by providing an entry address to the Read Only memory access circuitry,
    means for accepting an entry address for processor sequences from the associated processor, and
    means for receiving an entry address to receiver sequences from other control units over the bus.

10. In a multiprocessor computing system including a plurality of individual processors capable of concurrently executing system instructions in response to an over all system instruction sequence the improvement which comprises:

a control mechanism for said system including a separate control unit for each processor each said control unit including:

means for communicating directly with its associated processor, interconnection bus means connecting all of said control units together and means in each control unit for communicating directly with one or more other control units over said interconnection bus, each control unit including a sequence controller which comprises a Read Only memory and its associated accessing circuitry said Read Only memory having stored therein a plurality of sets of instruction sequences including processor sequences and receiver sequences, means in each unit for taking over control of said bus under instruction from a processor sequence and means for requesting a receiver sequence in another control unit in response to an instruction in a processor sequence.

11. A multiprocessor computing system as set forth in claim 10 wherein said system includes means for sequentially passing access to said but to the different control units in said system in a predetermined order, and means in each control unit operative in response to a signal appearing on said bus to recognize when it has access to said bus.

12. A multiprocessor computing system as set forth in claim 11 including means in each control unit to execute processor sequences specified by its associated processor, and means for supplyling an entry address to said processor sequence in the Read Only memory from said processor to said Read Only memory addressing circuitry.

13. A multiprocessor computing system as set forth in claim 12 wherein each control unit includes means for accessing and executing a receiver sequence specified by another control unit said last named means including:

means for receiving an entry address to said receiver sequence from the bus and for supplying same to the accessing circuitry of said Read Only memory.

14. A multiprocessor computing system as set forth in claim 13 including means responsive to an instruction in a processor sequence for requesting a receiver sequence in one or more of the other control units in said system, said last named means including:

means for placing an identifier code peculiar to the control unit whose services are desired on the bus.

15. A multiprocessor computing system as set forth in claim 14 wherein each control unit includes means for recognizing a request for a receiver sequence from another control unit in said system, said last named means including:

register means for storing a predetermined identifier code peculiar to that control unit and means for comparing the identification code stored in said register with an identification code appearing on said bus and for producing a recognitifon signal when a match occurs.

16. A multiprocessor computing system as set forth in claim 15 wherein each control unit includes means for interrupting a processor sequence in that control unit when a request for a receiver sequence is received from another control unit.

17. A multiprocessor computing system as set forth in claim 16 wherein each control unit includes means for saving the interruption point in the interrupted processor sequence when a receiver sequence is requested.

18. A multiprocessor computing system as set forth in claim 17 wherein said last named means comprises means for storing the address in the Read Only memory of the processor sequence instruction at the point of interruption.

19. A multiprocessor computing system as set forth in claim 18 wherein each control unit includes means for resuming an interrupted processor sequence after the interrupting receiver sequence has been completed, said means including means for obtaining the address of the interruption point of said interrupted processor sequence from storage and supplying said address to the Read Only memory access circuitry.

20. A multiprocessor computing system as set forth in claim 19 wherein each control unit includes means for preventing the interruption of an already begun receiver sequence in said control unit even though a request for a new receiver sequence in that control unit is received from the bus.

21. A multiprocessor computing system as set forth in claim 20 wherein said last named means includes means for transmitting an effective "busy" signal over the bus to the control unit requesting the receiver sequence and means in each control unit for holding up the processor sequence in the requesting control unit until the receiver sequence currently being executed in the requested control unit is completed.

22. A multiprocessor computing system as set forth in claim 21 wherein said system includes an over all system clock for applying timing pulses to each of said control units to effect essentially synchronous operation of said control mechanism.

References Cited

UNITED STATES PATENTS

| | | | |
|---|---|---|---|
| 3,350,689 | 10/1967 | Underhill et al. | 340—172.5 |
| 3,363,234 | 1/1968 | Erickson et al. | 340—172.5 |
| 3,247,488 | 4/1966 | Welsh et al. | 340—172.5 |
| 3,287,705 | 11/1966 | Rosenblatt et al. | 340—172.5 |

OTHER REFERENCES

I.B.M. Technical Disclosure Bulletin, vol. 8, No. 7, December 1965, pages 962–964.

PAUL J. HENON, Primary Examiner

P. R. WOODS, Assistant Examiner